United States Patent
Kim et al.

(10) Patent No.: US 7,801,568 B2
(45) Date of Patent: Sep. 21, 2010

(54) MOBILE TERMINAL, METHOD OF PROVIDING IMAGE THEREOF, AND METHOD OF PROVIDING MULTIMEDIA DATA THEREOF

(75) Inventors: Huhn Kim, Seoul (KR); Sang Yeon Lim, Gyeonggi-do (KR); Hyun Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 11/783,212

(22) Filed: Apr. 6, 2007

(65) Prior Publication Data

US 2007/0247090 A1    Oct. 25, 2007

(30) Foreign Application Priority Data

Apr. 25, 2006    (KR) .................... 10-2006-0037257

(51) Int. Cl.
*H04W 24/00* (2009.01)
*H04M 1/00* (2006.01)
(52) U.S. Cl. ............... 455/566; 455/425; 455/550.1; 455/556.2
(58) Field of Classification Search ............. 455/3.06, 455/418–420, 550.1, 556.1–556.2, 557–558, 455/566, 575.3, 403, 414.1, 414.4, 425, 515; 345/4, 33–34, 36, 39, 41, 162, 168–170, 345/172–173, 179–181, 183, 187, 214–215, 345/519, 534, 547, 690, 44, 48, 51, 55–56, 345/76–77, 81–84, 98, 160; 382/214–216, 382/305, 307, 312–313, 314, 162, 164–166, 382/170–171, 173, 194; 341/22, 27, 34; 200/1 B, 1 TK, 5 E, 43.06, 339, 341, 406, 200/412, 516, 520, 530; 348/14.01, 14.02, 348/14.1, 24, 63, 70, 234–236, 238, 272, 348/294, 333.05, 333.11, 383
See application file for complete search history.

(56) References Cited

U.S. PATENT DOCUMENTS

| 4,794,634 | A | 12/1988 | Torihata et al. |
| 6,762,743 | B2 * | 7/2004 | Yoshihara et al. ........... 345/102 |
| 7,147,555 | B1 * | 12/2006 | Harpaz ......................... 463/9 |
| 7,211,958 | B2 * | 5/2007 | Maurer et al. ................ 315/123 |
| 7,595,791 | B2 * | 9/2009 | Takata et al. ................. 345/174 |
| 2002/0198055 | A1 * | 12/2002 | Bull et al. ..................... 463/49 |
| 2005/0057539 | A1 * | 3/2005 | Ong ........................... 345/204 |
| 2006/0066928 | A1 * | 3/2006 | Katou ......................... 358/518 |
| 2006/0232541 | A1 * | 10/2006 | Kudo et al. ................... 345/98 |

FOREIGN PATENT DOCUMENTS

| EP | 1 331 546 A2 | 7/2003 |
| GB | 2 334 680 A | 9/1999 |

* cited by examiner

*Primary Examiner*—Meless N Zewdu
(74) *Attorney, Agent, or Firm*—Birch, Stewart, Kolasch & Birch, LLP (57) ABSTRACT

A method of providing data in a mobile terminal, which includes detecting whether or not at least one luminous element among a plurality of luminous elements included in a display of the terminal has been contacted, and controlling a luminescence of said at least one luminous element if the detecting step determines the at least one luminous element has been contacted.

28 Claims, 8 Drawing Sheets

FIG. 8

# MOBILE TERMINAL, METHOD OF PROVIDING IMAGE THEREOF, AND METHOD OF PROVIDING MULTIMEDIA DATA THEREOF

This application claims the benefit of the Korean Patent Application No. 10-2006-0037257, filed on Apr. 25, 2006, which is hereby incorporated by reference in its entirety.

BACKGROUND OF THE INVENTION

1. Field of the Invention

The present invention relates to a mobile terminal, and corresponding method that allows a user to create images and associated sounds on a display unit of the mobile terminal.

2. Discussion of the Related Art

Personal mobile terminals such as a folding type cellular phone include a display on the outside of the terminal so a user can view status information, the current time, etc. when the terminal is folded closed. However, the information displayed is preset by the manufacturer of the terminal and can not be changed or set by the user.

SUMMARY OF THE INVENTION

Accordingly, one object of the present invention is to address the above-noted and other problems.

Another object of the present invention is to provide a mobile terminal and corresponding method that allows a user to conveniently and easily produce and change information displayed on a display of the terminal by simply touching the display.

To achieve these objects and other advantages and in accordance with the purpose of the invention, as embodied and broadly described herein, the present invention provides in one aspect a method of providing data in a mobile terminal. The method includes detecting whether or not at least one luminous element among a plurality of luminous elements included in a display of the terminal has been contacted, and controlling a luminescence of said at least one luminous element if the detecting step determines the at least one luminous element has been contacted.

In another aspect, the present invention provides A mobile terminal including a display unit including a plurality of luminous elements, a detecting unit configured to detect whether or not at least one luminous element among the plurality of luminous elements has been contacted, and a controlling unit configured to control a luminescence of said at least one luminous element if the detecting unit determines the at least one luminous element has been contacted.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The following description refers to various types of mobile terminals such as a mobile phone, a digital broadcast terminal, an MP3 player, a PDA (personal digital assistant), a PMP (portable multimedia player), etc. In addition, multimedia data associated with the present invention includes data containing music, images, etc. Further, an image associated with the present invention includes a single picture or animation.

Figure 1:
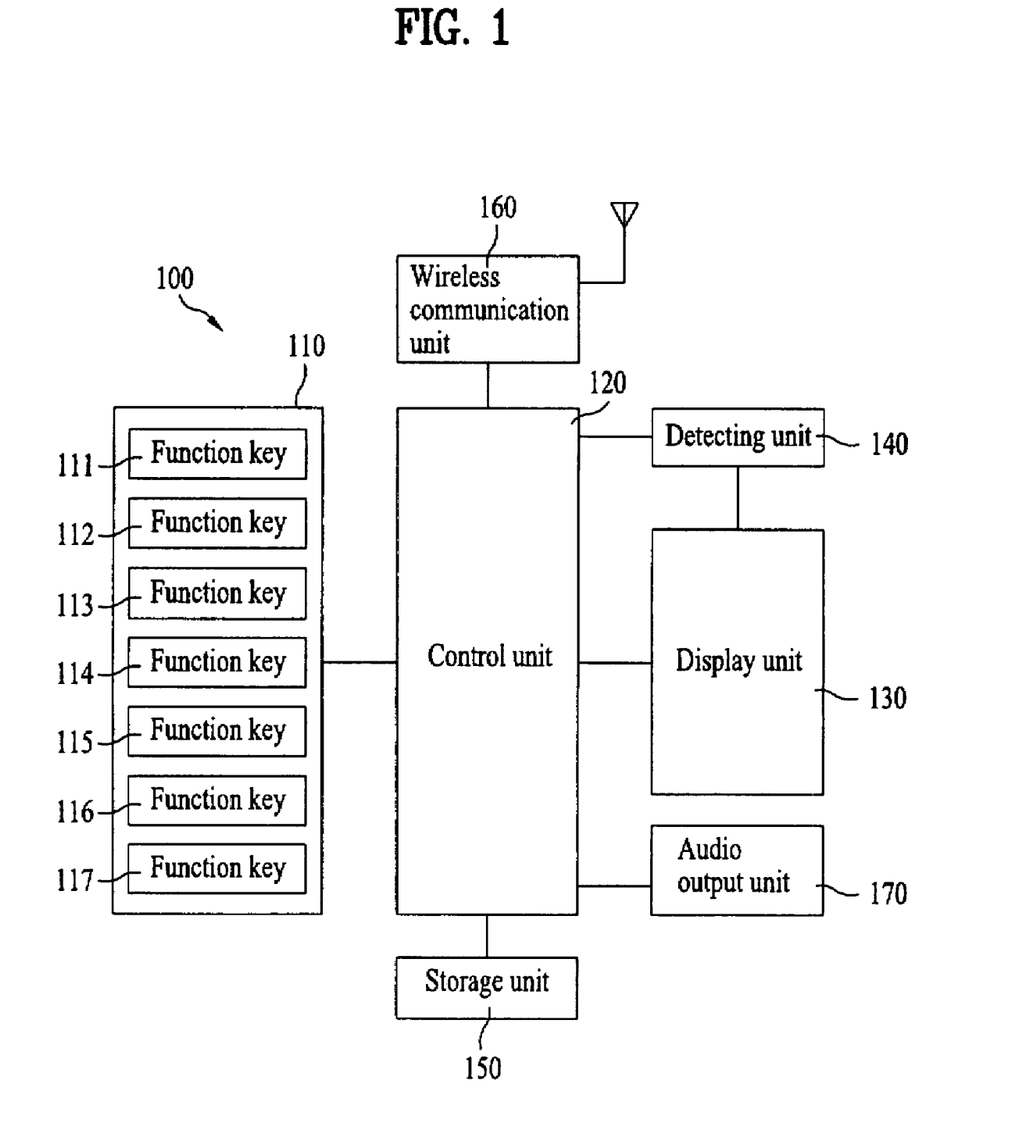
FIG. 1 is a block diagram of a mobile terminal according to an embodiment of the present invention.

Turning first to FIG. 1, which is block diagram of a mobile terminal 100 according to an embodiment of the present invention. As shown, the mobile terminal 100 includes an input unit 110, a control unit 120, a display unit 130, a detecting unit 140, a storage unit 150, a wireless communication unit 160, and an audio output unit 170.

Figure 2:
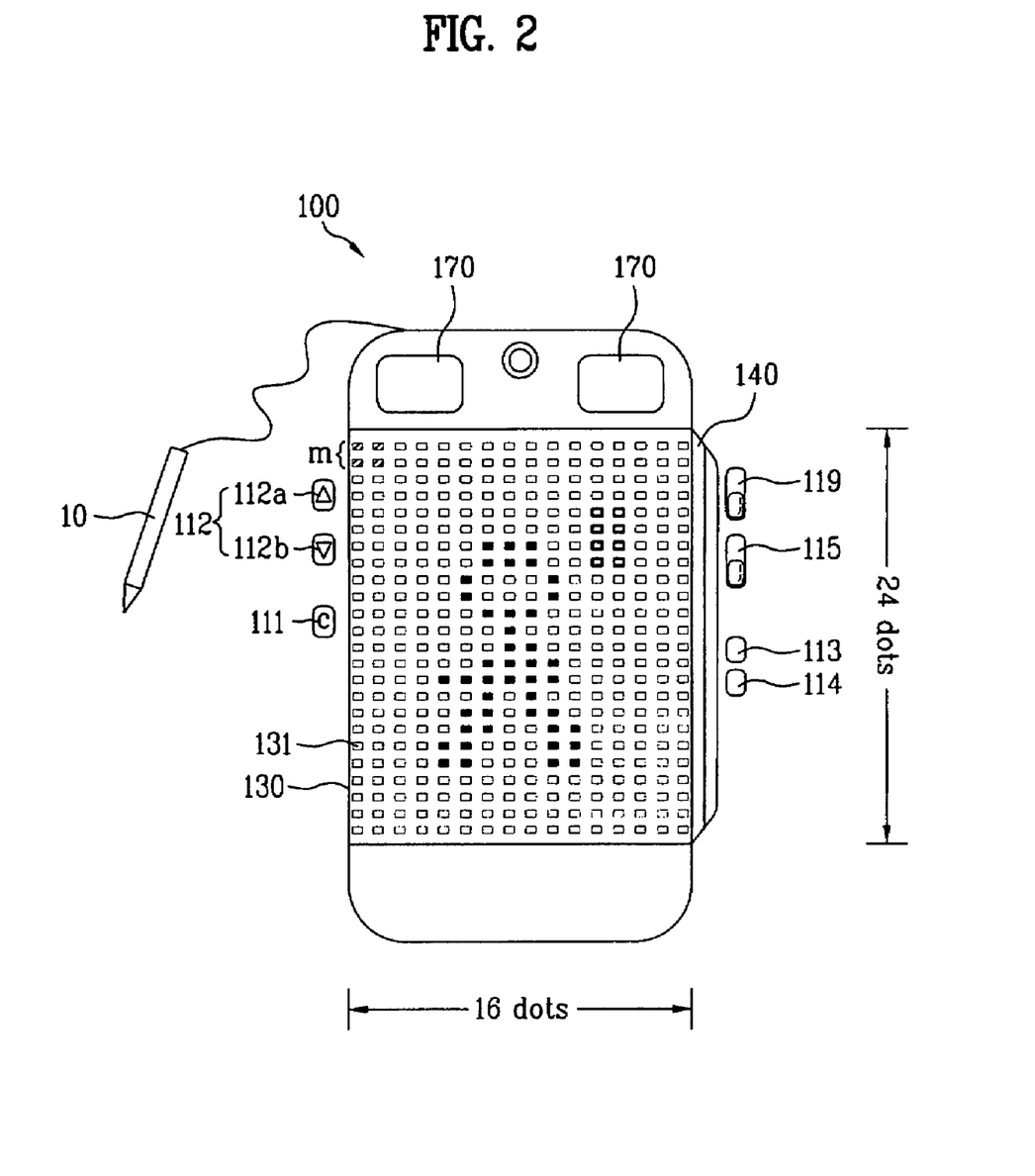
FIG. 2 is a conceptual diagram of the mobile terminal shown in FIG. 1.

The input unit 110 includes a plurality of function keys 111-117. A detailed description of the function keys 111-117 will be provided throughout this description. As shown in FIG. 2, the display unit 130 includes a plurality of luminous elements 131. In addition, each luminous element 131 converts electricity into light. For example, the luminous elements 131 may be a light emitting diode (LED), a semiconductor laser, an organic electroluminescent device (OELD), an inorganic electroluminescent device, etc.

Further, as shown in FIG. 2, the plurality of the luminous elements 131 can be arranged on the display unit 130 in a matrix form. In addition, the detecting unit 140 detects when a user contacts the display unit 130. For example, the user may contact the display unit 130 using a stylus 10 (see FIG. 2) or by using his or her finger. Thus, the detecting unit 140 can be configured as a touch panel, a touch sensor, etc.

In addition, as shown in FIG. 2, the detecting unit 140 is provided to a plane on which the luminous elements 131 are arranged. Further, the detecting unit 140 determines a coordinate value of the position of the display unit 140 touched. In one example, the display unit includes 16×24 luminous dots 131 to form the display unit 140. Thus, the detecting unit 140 determines which column and row was touched for each luminous element 131.

Further, the terminal 100 may be placed into a hold-released mode or a hold-set mode. The hold-release mode is a mode in which the detecting unit 140 can detect when the luminous elements 131 are contacted via the stylus 10. The hold-set mode is a mode in which the detecting unit 140 can not detect when the luminous elements 131 are touched. The user can toggle between these two modes by selecting the fifth function key 115.

Therefore, when one of the luminous elements 131 is touched, the detecting unit 140 transmits a corresponding signal to the control unit 120. That is, the corresponding signal includes information about which luminous element 131 was touched (e.g., a column and row number), how many times a luminous element 131 was touched (e.g., once, twice, three times, etc.) or any other information needed by the control unit 120.

Therefore, the control unit 120 is able to control a luminescence value of the touched luminous element(s) 131. For example, the control unit 120 may turn on or turn off a corresponding luminous element 131, change a brightness value, change a color, etc. Further, the luminescence control can be performed based on a number of times a luminous element 131 is touched. For example, if a luminous element 131 is touched an odd number of times, the luminous element 131 is turned on. On the contrary, if a luminescence element 131 is touched an even number of times, the luminous element 131 is turned off.

In addition, the first function key 111 can be used to turn off all currently turned-on luminous elements 131. Thus, the function key 111 can be used to delete a currently displayed luminous image. In other words, if the first function key 111 is pressed by a user, all turned-on luminous elements are turned off.

The control unit 120 can also control a color variation for turned-on luminous elements. In more detail, the second function key 112 can be manipulated by the user to change or set the color variation of the luminous elements 131. For instance, assuming that a luminous element has variable colors of white, yellow, red, blue, and green, the colors can then be varied in a sequence of white→yellow→red→blue→green if an upward key 112a (see FIG. 2) of the second function key 112 is pressed.

Further, at least one luminous element at one side among the plurality of the luminous elements 131 is configured to emit light that corresponds to the current color mode. For instance, and as shown in FIG. 2, if a current color mode is a yellow mode, the luminous elements "m" at one side emits yellow light. Further, when the user changes the current yellow color mode to the red mode, the luminous elements "m" emit a red color. Therefore, the user can easily see what the current color mode is. Note that FIG. 2 illustrates four luminous elements "m" for emitting the current color mode. However, any number may be used.

In addition, rather than using the function keys 112a and 112b to vary the color, the color variation can be performed based on a number of times the user contacts the display unit 130. For instance, assume a luminous element has variable colors of white, yellow, red, blue, and green. Then, the color is varied in accordance with the number of times the user contacts a portion of the display unit 130. For example, the color of the luminous element corresponding to the contacted position can be changed in a sequence of off→white→yellow→red→green→blue according the number of times the user sequentially touches a predetermined contact position.

Thus, in this example, the luminous elements can be turned on and off and the color of the elements can be changed based on a number of times the user contacts the display. Therefore, the second function key 112 can be omitted in this example (or used for another function). In addition, each luminous element 131 can be touched to vary a color of that particular luminous element 131 (rather than changing all currently emitting luminous elements).

Figure 3:
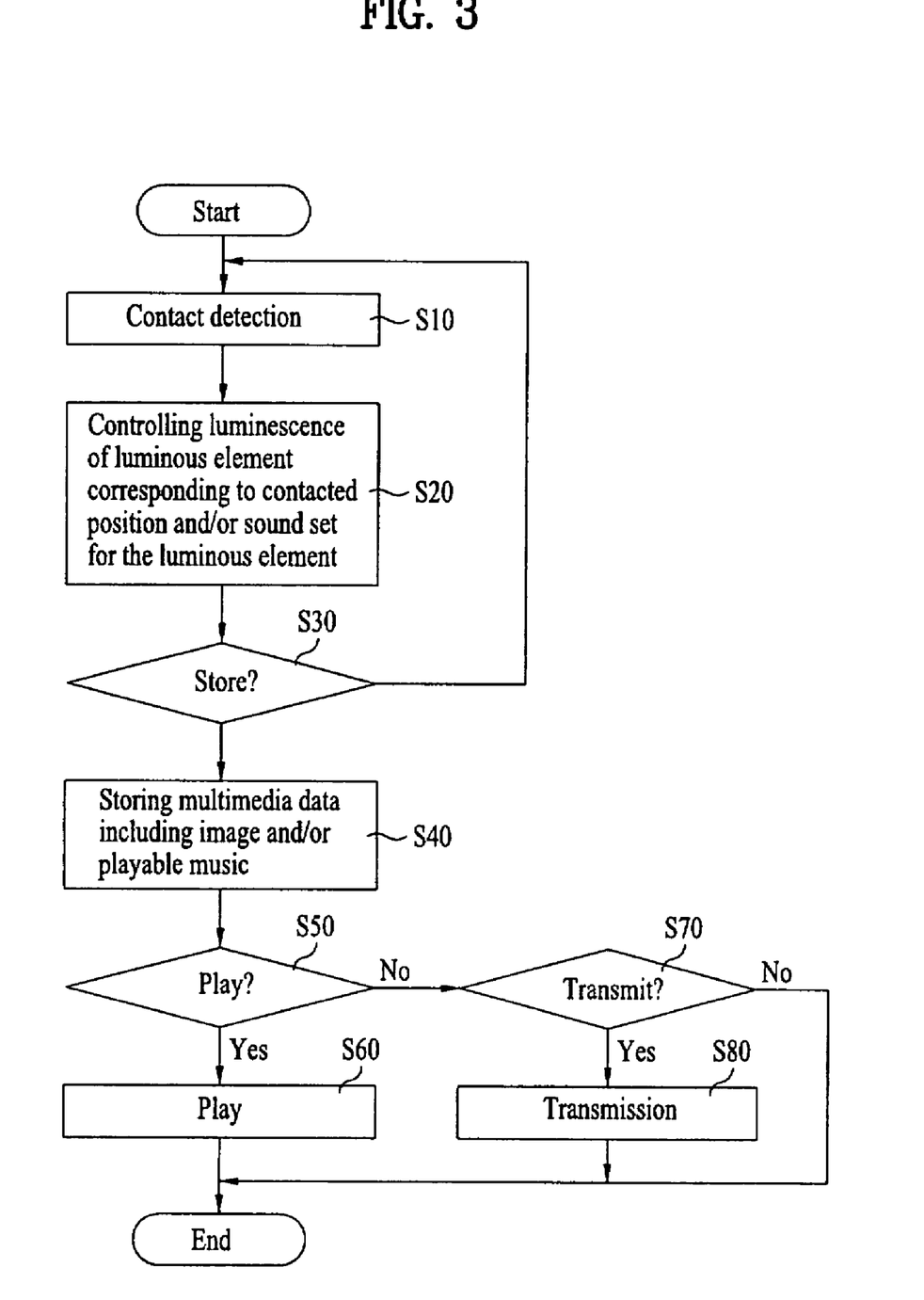
FIG. 3 is a flowchart illustrating a method of providing multimedia data in a mobile terminal according to an embodiment of the present invention.

Turning next to FIG. 3, which is a flowchart illustrating a method of providing an image or multimedia data in a mobile terminal according to an embodiment of the present invention. FIGS. 1 and 2 will also be referred to in this description. As shown, the detecting unit 140 determines if the user contacts the display unit 130 (step S10). The user can contact the display unit 140 using a stylus or his or her finger, for example. For example, the user can touch a particular luminous element a certain number of times.

The control unit 120 then controls (e.g., turns on and off, varies the color, etc.) the touched luminous element based on the number of times the user contacted the luminous element (step S20). In addition, the control unit 120 can also be configured to control a sound for the touched luminous element. In more detail, the set sound may be a tone or an instrumental sound for the luminous element. For instance, if luminous elements are arranged in a matrix form, an intrinsic tone can be set for each luminous element such as 'do', 're', and 'mi' to the '$1^{st}$ column & $1^{st}$ row', '$2^{nd}$ column & $1^{st}$ row', and '$3^{rd}$ column & $1^{st}$ row', respectively. Alternatively, an instrumental sound such as a piano sound, a guitar sound, and a drum sound can be assigned to the '$1^{st}$ column & $2^{nd}$ row', $2^{nd}$ column & $2^{nd}$ row', and '$3^{rd}$ column & $2^{nd}$ row' luminous elements, respectively.

Therefore, as a user contacts different positions on the display unit 130 using the pointing device 10, different musical sounds can be played. In addition, the played music is output via the audio output unit 170. Further, the played music can be recorded using a separate function key (not shown) provided to the input unit 110 or another function key.

Alternatively, the music may be stored by contacting the corresponding luminous element. For example, if a luminous element arranged on $16^{th}$ column and $24^{th}$ row is contacted an odd number of times, the recording mode is turned on. On the contrary, if a luminous element arranged on $16^{th}$ column and $24^{th}$ row is contacted an even number of times, the recording mode is turned off.

Further, the mobile terminal 100 can be set to generate sounds or music when the display unit 120 is touched only if the hold-set mode is released. In this instance, the hold-set or hold-release command signal for sound generation can be generated using the seventh function key 117 of the input unit 110.

Thus, the user can create an image on the display unit 113 by touching certain luminous elements. The user can also set a particular color or sound for each luminous element (as discussed above).

In addition, as shown in FIG. 3, the method determines if the user wants to store the created image or sounds (step S30). If the user wants to store the created image or sound pattern (yes in step S30), the control unit 120 stores the appropriate information for the corresponding luminous elements in the storage unit 150 (step S40). That is, the appropriate information is the information used for recreating the create image or sound pattern. For example, the information may include a color, sound, display time period, etc. for each luminous element.

Further, to store the information, the user may press the third function key 113 to instruct the control unit 120 to perform the storing operation. An example will now be given regarding the storing operation. First, assume there are a total of 384 luminous elements arranged in a 24*16 matrix form. Then, the positional information (e.g., coordinate value or matrix index), color information (e.g., red, blue, etc.), sound information, display time period for each currently turned-on luminous element, etc. is stored in the storage unit 150. Optionally, image information for a plurality of different displayed images can be stored. Of course, the image information may include luminescence information for each image. In addition, the musical notes assigned to each element may be stored as a musical arrangement. The musical arrangement can also be stored together with the image, such that music is played together with the displayed image.

Next, as shown in FIG. 3, the method determines whether or not the user wants to display a stored image or play a stored musical arrangement (step S50). If the user wants to display or play the stored image or music (yes in step S50), the control unit 120 executes the requested function (step S60). In more detail, the stored image can be displayed based on the stored luminescence information for each luminous element of the display unit 130. Similarly, the stored musical arrangement can be played via the audio output unit 170.

In addition, as shown in steps S70 and S80 in FIG. 3, the stored images or multimedia data can be transmitted to another party. That is, the multimedia data or image information can be transmitted to the other party via the wireless communication unit 160 based on the particular transmission control signal used by the control unit 120. The sixth function key 116 may be used to perform the transmission process.

That is, the wireless communication unit 160 is a communication device transmitting image information or multimedia data to the other party via a wireless communication network according to a transmission command signal generated from the sixth function key 116 being manipulated. Further, to transmit the image information and multimedia data, a phone number of the other party is first input and the desired image information or multimedia data is selected. Therefore, the sixth function key 116 preferably includes a numeral keypad, a send button, and an end button.

Figure 4:
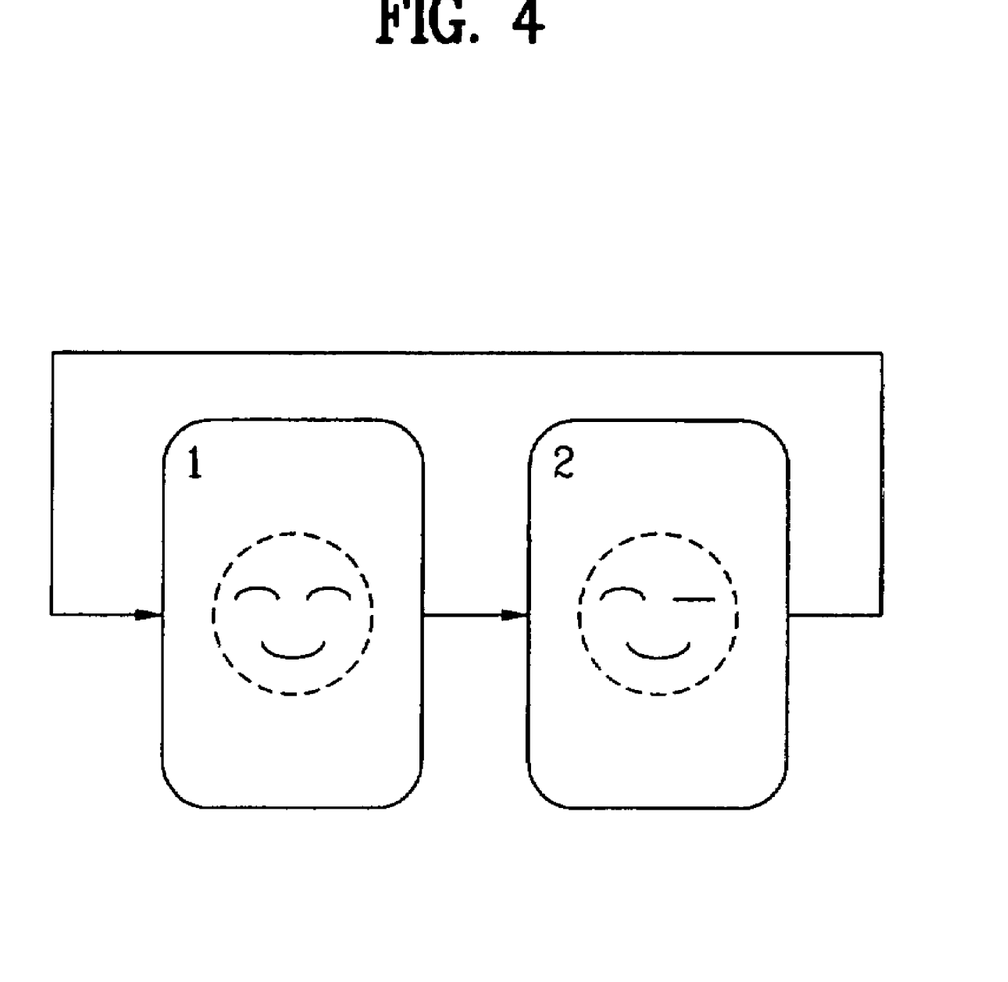
FIG. 4 is a conceptual diagram illustrating images being continuously played on a mobile terminal according to an embodiment of the present invention.

In addition, when the user has stored a plurality of images, the stored plurality of images can be displayed in time series. For example, FIG. 4 is a conceptional diagram illustrating images being continuously played (e.g., in a time series) using a mobile terminal according to an embodiment of the present invention. In more detail, image information for a first image-1 and image information for a second image-2 in FIG. 4 are stored. Then, the user can sequentially display the stored first and second images to present a character that winks.

Figure 5:
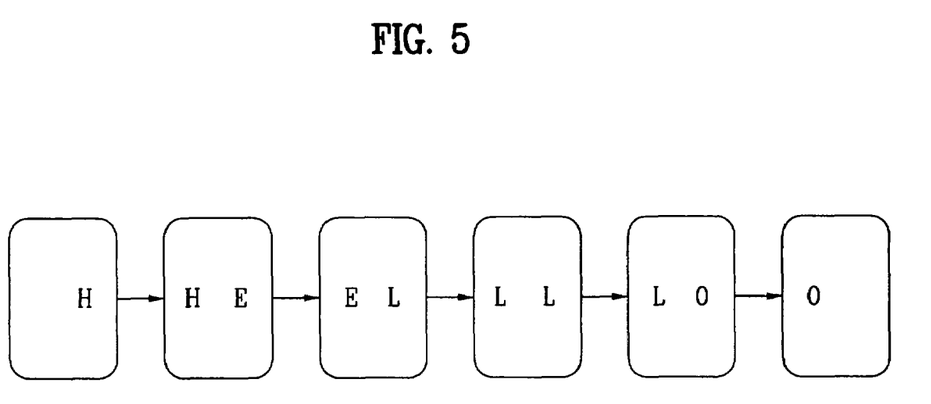
FIG. 5 is a conceptual diagram illustrating images being played in a slide mode on a mobile terminal according to an embodiment of the present invention.

The stored images may also be displayed in a slide mode. For example, FIG. 5 is a conceptual diagram illustrating characters of the word "HELLO" being displayed in a slide mode. In addition, the fourth function key 114 of the input unit 110 can be used to play images. For example, images can be played by pressing the fourth function key 114 for a short amount of time. Continuous play of the images can be performed by pressing the fourth function key 114 for a long period of time.

In addition, when playable music or a bell sound is stored, the music and bell sounds can be played in a continuous manner or slide manner. Further, the images and music or bell sounds can be played together. That is, the images are displayed on the display unit 130 and the music or bell sounds are output via the audio output unit 170.

Further, although not shown in the drawings, the mobile terminal 100 according to an embodiment of the present invention may provided with a key to execute a separate toolbox to enable luminous elements arranged in a box shape (or other shape) to emit light by a single input of the key. For instance, if a user selects a rectangle shape from a plurality of different shapes in a toolbox and then touches the pointing device 10 against a specific position of the display unit 130, the luminous elements in a rectangular pattern in a preset progress direction are sequentially or simultaneously illuminated.

Figure 6:
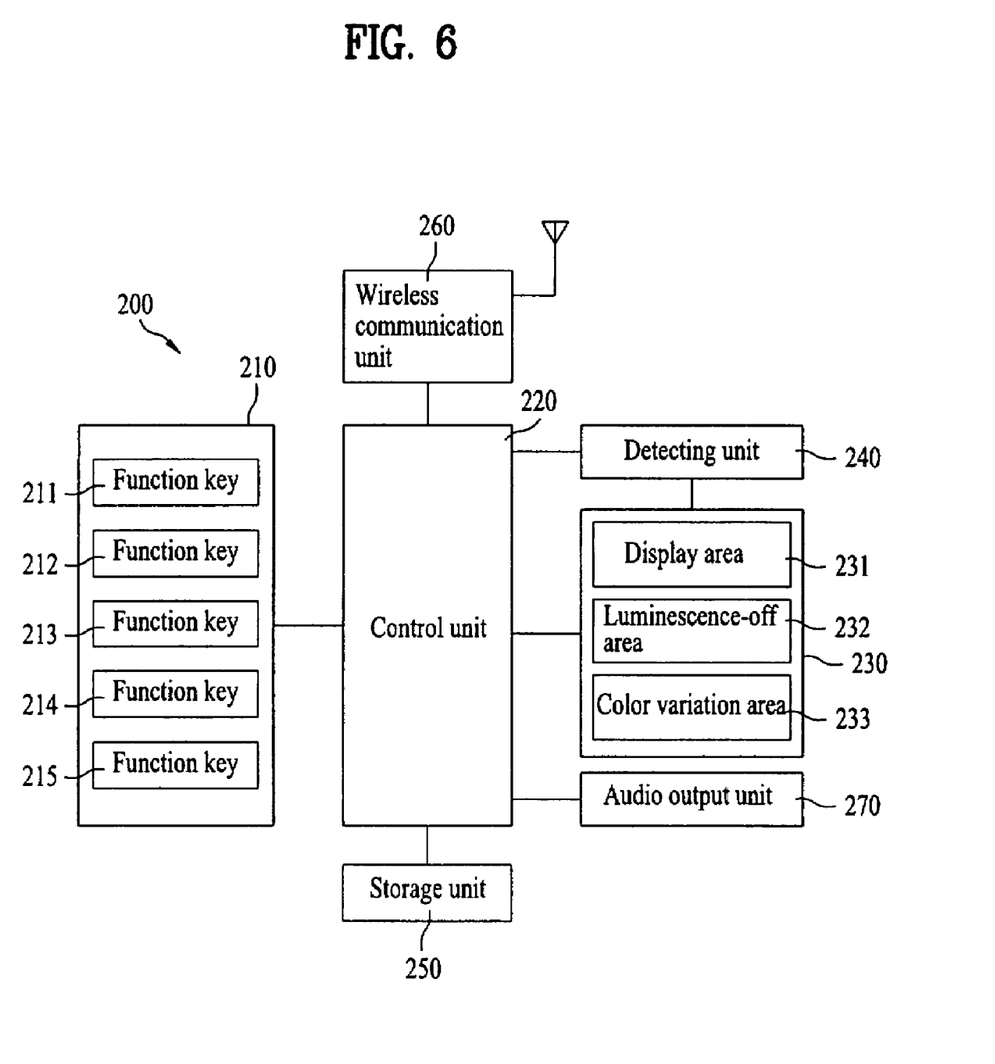
FIG. 6 is a block diagram of a mobile terminal according to another embodiment of the present invention.

Turning now to FIG. 6, which is a block diagram of a mobile terminal 200 according to another embodiment of the present invention. As shown, the mobile terminal 200 includes an input unit 210, a control unit 220, a display unit 230, a detecting unit 240, a storage unit 250, a wireless communication unit 260, and an audio output unit 270.

Some of these elements are similar to the elements shown in 1. For example, the display unit 230 includes a plurality of luminous elements such as a light emitting diode (LED), a semiconductor laser, an organic electroluminescent device, an inorganic electroluminescent device, etc. As shown in the example of FIG. 7, the luminous elements are arranged on the display unit 230 in a matrix form.

Further, the detecting unit 240 detects when a pointing device 10 contacts the display unit. That is, the detecting unit 240 can be a touch panel, touch sensor, etc. that is provided to a plane of the display unit 230. Therefore, the detecting unit 240 detects whether the pointing device has contacted the display unit 230 and what portion of the display unit is touched.

Further, similar to the embodiment discussed above, the mobile terminal 200 may be placed in a hold-release mode or a hold-set mode. The hold-release mode allows the detection unit 240 to detect input, and the hold-set mode prevents the detecting unit from detecting any input. The first function key 211 included in the input unit 210 may be used to toggle between these two modes.

Figure 7:
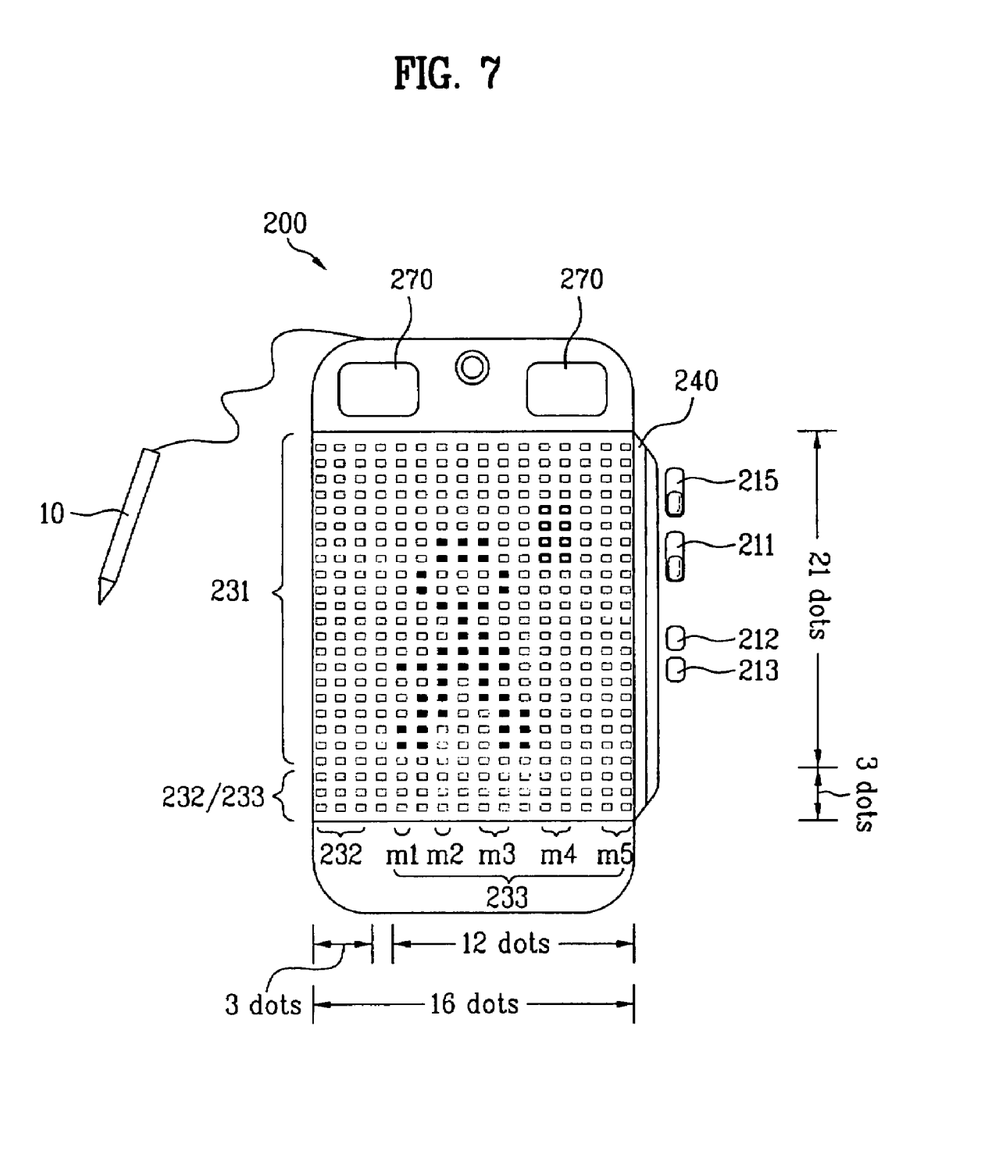
FIG. 7 is a conceptual diagram of the mobile terminal shown in FIG. 6.

Further, as shown in FIG. 7, in the present embodiment, the display unit 230 is divided into a display area 231, a luminescence-off area 232, and a color variation area 233. The display area 231 includes a plurality of the luminous elements that emit light when contacted. Further, if the luminescence-off area 232 is contacted with the pointing device 10, the control unit 220 recognizes the contact as an image deleting command and then turns off all of the luminous elements in the display area 231.

In addition, if the position contacted with the pointing device 10 corresponds to the color variation area 233, the control unit 220 determines which portion of the color variation area 233 is contacted. That is, the control unit 220 determines which area m1, m2, m3, m4, or m5 in the color variation area 233 is contacted. A current color mode is then changed into a color mode matching the corresponding area.

For instance, assuming that color modes corresponding to the areas m1, m2, m3, m4, and m5 are white, yellow, red, green, and blue, respectively, if the position contacted with the pointing device 10 corresponds to the area m3, a currently luminous color can be changed into a red mode. In addition, the color variation includes not only a variation of one color of one luminous element turned on the display area 231 but also includes variations of all colors for all luminous elements turned on in the display area 231.

Thus, the detecting unit 240 transfers information for the presence or non-presence of the contact and information for the contacted position to the control unit 220. Then, the control unit 220 is able to control the luminescence of the luminous elements corresponding to the contacted position. Further, the luminescence elements can be turned off by contacting the luminous-off area 232 with the pointing device 10.

In addition, the control unit 220 can control the luminescence characteristics of each luminous element based a number of times the particular luminous element is contacted. For instance, if the luminous element is contacted an odd number of times, the luminous element is turned on, and if the luminous element is contacted an even number of times, the luminous element is turned off.

A similar situation applies to a sound set for the luminous element. As discussed above, the set sound may be a tone or an instrumental sound. For instance, if luminous elements are arranged in a matrix form, an intrinsic tone can be set for each luminous element such as 'do', 're', and 'mi' to the '$1^{st}$ column & $1^{st}$ row', '$2^{nd}$ column & $1^{st}$ row', and '$3^{rd}$ column & $1^{st}$ row', respectively. Alternatively, an instrumental sound can be assigned to each luminous element such as a piano sound, a guitar sound, and a drum sound to the '$1^{st}$ column & $2^{nd}$ row', $2^{nd}$ column & $2^{nd}$ row', and '$3^{rd}$ column & $2^{nd}$ row', respectively.

Therefore, when the user contacts different positions of the display unit 130 using the pointing device 10, music can be played in various ways according to various instrumental sounds. That is, the played music is output via the audio output unit 270. The played music can also be recorded as well using a separate function key (not shown in the drawing) provided to the input unit 210 or another standard function key. The recording function can also be performed by contacting a corresponding luminous element provided to the display unit 230. For instance, if the luminous element arranged on $16^{th}$ column and $24^{th}$ row is contacted an odd number of times, the recording mode can be turned on, and if the luminous element arranged on $16^{th}$ column and $24^{th}$ row is contacted an even number of times, the recording mode is turned off.

Further, the process of generating sounds when a luminous element is contacted can be set to operate only when the mobile terminal 200 is set in the hold-release mode. That is, the first function key 211 may be used to toggle between the different hold-set and hold release modes. The fifth function key 215 may also be used to set the record mode on and off.

Thus, as shown in FIG. 7, the luminous elements turned on by the above method can be used to display an image in the display area 233. That is, the luminescence information for each luminous element is used by the control unit 220 to display an image on the display area 233 of the display unit 230. The user can also store images or sounds via the storage unit 250 under the control of the control unit 220.

That is, the use can select the second function key 212 to store a created image or sound. For instance, if as shown in FIG. 7, when there are a total of 384 luminous elements arranged in 24*16 matrix form, position information (coordinate value or matrix index) and color information (e.g., red, blue, etc.) for the currently turned-on luminous elements can be stored. As discussed above, image information for a plurality of displayed images can also be stored. In this instance, the image information includes luminescence information for each of the images.

Figure 8:
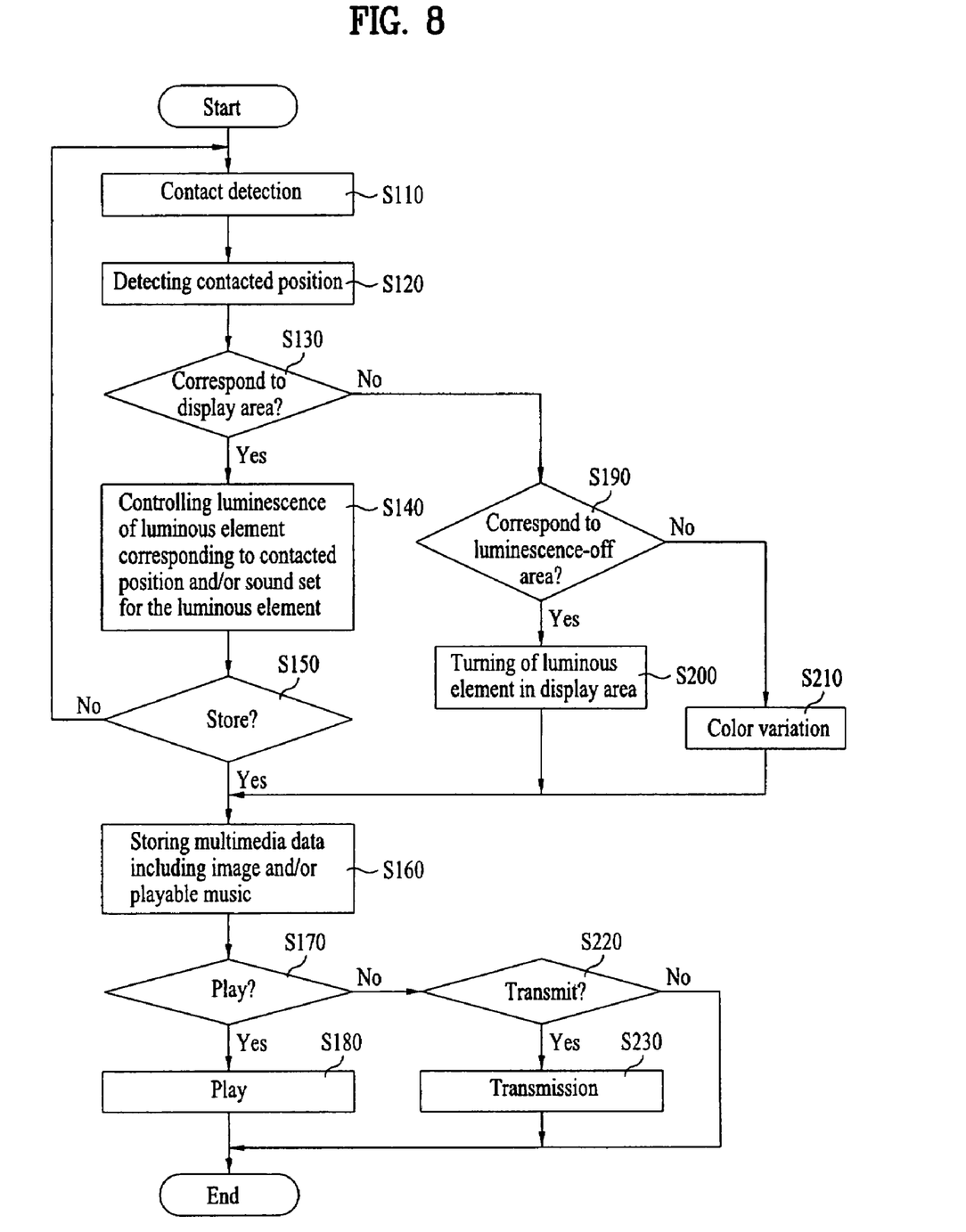
FIG. 8 is a flowchart illustrating a method of providing multimedia data in a mobile terminal according to another embodiment of the present invention.

Turning now to FIG. 8, which is a flowchart illustrating a method for providing images and multimedia information on the mobile terminal 200 according to an embodiment of the present invention. FIGS. 6 and 7 will also be referred to in this description.

First, the detecting unit 240 detects when the display unit 230 is contacted (step S110) and what position of the display unit 230 is contacted (step S120). For example, the control unit 220 determines if any luminous elements in the display area 231 are contacted (step S130). If no luminous elements are contacted in the display area (no in step S130), the control unit 220 determines whether a luminous element in the luminous-off area 232 is contacted (step S190). If no luminous elements are contacted in the luminescence-off area 232 (no in step S190), the control unit 220 determines in which area of the m1, m2, m3, m4 or m5 areas in the color variation area 233 are contacted (step S210).

In addition, if a luminous element(s) is contacted in the display area 231, the control unit 220 appropriately controls the luminous element(s) to emit light having a certain color and/or to play a particular sound (step S140) (as discussed above). Further, the method also determines if the user has requested the luminous information be stored (step S550). That is, the control unit 220 determines if the user has selected the second function key 212. If the user has requested the luminous information be stored (yes in step S150), the control unit 120 stores the luminous information in the storage unit 250 (S160).

In addition, if the detecting unit 240 determines the luminous-off area 232 has been contacted (yes in step S190), the control unit 220 appropriately controls the luminescence-off area (step S200). That is, the control unit 220 turns on or off the luminous elements in the display area 231. The control unit also similarly varies the colors of the luminous elements in the display area 231 when the different areas m1 to m5 are selected in the color variation area 233 (step S210).

In addition, similar to the embodiment discussed in FIG. 3, the method also determines if the user wants to play back the stored image(s) or sound(s) (step S170). That is, the control unit 220 determines whether or not the user has selected the third function key 213 requesting the luminous information be played. Further, the third function key 213 can be used to display the images/sounds by pressing the third function 213 key for a short period of time. The images/sounds may also be continuously played by holding down the third function key. In addition, as mentioned above, the stored images may be played together with music or bell sounds.

If the user has requested the information be played back (yes in step S170), the control unit 220 displays the selected luminous elements in the display area 231 and outputs any stored sounds associated with the displayed image via the audio output unit 270 (step S180).

Similar to the first embodiment in FIG. 3, the user can also transmit the stored luminous information (image, music, etc.) to another user (steps S220 and S230). That is, the user can select the fourth function key 214 to transmit the stored information (image, sounds, etc.) to another party via the wireless communication unit 260 according to a transmission control signal of the control unit 220. Further, the fourth function key 214 includes a numeral keypad, a send button, and an end button and operates in a similar manner as sixth function key 116 in FIG. 1.

Further, the played music (bell sound included) can be stored as multimedia data together with the image information. In addition, a plurality of stored images can be played in time series as shown in FIG. 4 or in a slide mode as shown in FIG. 5 (similar to the first embodiment).

Accordingly, the present invention provides the following effects or advantages.

First of all, a user is able to directly produce an image to be displayed on an exterior of a terminal. Hence, the user can easily draw images on the terminal. Secondly, the user can easily input commands on the terminal via a single push or touch of a luminous element. For example, the user can delete, change a color mode, store information, playback stored information, perform a continuous play operation, set a hold mode, etc. via the terminal according to an embodiment of the present invention.

Thirdly, numerous luminous elements can be selected and used to represent an image with varying colors, to thereby create an attractive exterior portion of the terminal. Fourthly, a plurality of similar images may be produced and stored to automatically be played as a moving image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing data in a mobile terminal, the method comprising:
    detecting, via a detecting device on the mobile terminal, whether or not at least one luminous element among a plurality of luminous elements included in a display of the terminal has been contacted; and
    controlling, via a controller on the mobile terminal, a luminescence of said at least one luminous element when the detecting step determines the at least one luminous element has been contacted,
    wherein the controlling step comprises:
    determining a number of times the at least one luminous element has been contacted; and
    controlling the at least one luminous element to be turned on and off or to change a color of the at least one luminous element based on the number of times the at least one luminous element has been contacted.

2. The method of claim 1, further comprising:
    determining when an on/off function key included in an input unit of the mobile terminal has been selected; and
    turning off all currently turned on luminous elements when the determining step determines the on/off function key has been selected.

3. The method of claim 1, further comprising:
    determining when a color variation function key included in an input unit of the mobile terminal has been selected; and
    varying a color of all currently turned on luminous elements when the determining step determines the color variation function key has been selected.

4. The method of claim 1, wherein the at least one contacted luminous element comprises a plurality of contacted luminous elements that are illuminated to form an image.

5. A method of providing data in a mobile terminal, the method comprising:
    detecting, via a detecting device on the mobile terminal, whether or not at least one luminous element among a plurality of luminous elements included in a display of the terminal has been contacted;
    controlling, via a controller on the mobile terminal, a luminescence of said at least one luminous element when the detecting step determines the at least one luminous element has been contacted, wherein the at least one contacted luminous element comprises a plurality of contacted luminous elements that are illuminated to form an image;
    determining, via the controller, when a storing function key included in an input unit of the mobile terminal has been selected; and
    storing, in a memory of the mobile terminal, image information indicating a luminous status of the plurality of contacted luminous elements forming the image when the determining step determines the storing function key is selected.

6. The method of claim 5, further comprising:
    determining when a playback function key included in the input unit of the mobile terminal has been selected; and
    displaying the image according to the stored image information when the determining step determines the playback function key is selected.

7. The method of claim 5, wherein the storing step stores image information for a plurality of images, and
    wherein the method further comprises displaying the plurality of stored images in a consecutive manner to produce a moving image or in a slide mode manner based on a manner in which the playback function key is selected.

8. The method of claim 5, further comprising:
    determining when a transmit function key included in the input unit of the mobile terminal has been selected; and
    transmitting the stored image information to another party if the determining step determines the transmit function key has been selected.

9. The method of claim 5, further comprising:
    controlling a sound of said at least one luminous element when the detecting step determines the at least one luminous element has been contacted.

10. The method of claim 9, wherein the sound includes an instrumental sound or a bell sound.

11. The method of claim 9, wherein each contacted luminous element has a corresponding sound, and
    wherein the method further comprises playing the sounds for the contacted luminous elements as music.

12. The method of claim 11, further comprising:
    storing the played music.

13. The method of claim 12, further comprising:
    displaying a stored image and playing the stored music simultaneously.

14. A mobile terminal, comprising:
    a display unit including a plurality of luminous elements;
    a detecting unit configured to detect whether or not at least one luminous element among the plurality of luminous elements has been contacted; and
    a controlling unit configured to control a luminescence of said at least one luminous element when the detecting unit determines the at least one luminous element has been contacted,
    wherein the controlling unit determines a number of times the at least one luminous element has been contacted, and controls the at least one luminous element to be turned on and off or to change a color of the at least one luminous element based on the number of times the at least one luminous element has been contacted.

15. The mobile terminal of claim 14, further comprising:
    an on/off function key configured to turn off all currently turned on luminous elements.

16. The mobile terminal of claim 14, further comprising:
    a color variation function key configured to vary a color of all currently turned on luminous elements.

17. The mobile terminal of claim 14, wherein the at least one contacted luminous element comprises a plurality of contacted luminous elements that are illuminated to form an image.

18. A mobile terminal, comprising:
    a display unit including a plurality of luminous elements;
    a detecting unit configured to detect whether or not at least one luminous element among the plurality of luminous elements has been contacted;
    a controlling unit configured to control a luminescence of said at least one luminous element when the detecting unit determines the at least one luminous element has been contacted, wherein the at least one contacted luminous element comprises a plurality of contacted luminous elements that are illuminated to form an image;
    a memory unit; and a storing function key configured to store image information indicating a luminous status of the plurality of contacted luminous elements forming an image in the memory unit.

19. The mobile terminal of claim 18, further comprising:
a playback function key configured to playback the image according to the stored image information.

20. The mobile terminal of claim 18, wherein a plurality of images are stored in the memory unit, and
wherein the plurality of stored images are displayed in a consecutive manner to produce a moving image or in a slide mode manner based on a manner in which the playback function key is selected.

21. The mobile terminal of claim 18, further comprising:
a wireless communication unit configured to wirelessly communicate with another party; and
a transmit function key configured to transmit the stored image information to said another party via the wireless communication unit.

22. The mobile terminal of claim 18, wherein the controlling unit controls a sound of said at least one luminous element when the detecting unit determines the at least one luminous element has been contacted.

23. The mobile terminal of claim 22, wherein the sound includes an instrumental sound or a bell sound.

24. The mobile terminal of claim 22, wherein each contacted luminous element having a corresponding sound, and
wherein the controlling unit plays the sounds for the contacted luminous elements as music.

25. The mobile terminal of claim 24, wherein the controlling unit stores the played music in the memory unit.

26. The mobile terminal of claim 25, wherein controlling unit displays the image formed in the memory and plays the stored music simultaneously.

27. A method of providing data mobile terminal, the method comprising:
detecting, via a detecting device on the mobile terminal, whether or not at least one luminous element among a plurality of luminous elements included in a display of the terminal has been contacted;
controlling, via a controller on the mobile terminal, a luminescence of said at least one luminous element when the detecting step determines the at least one luminous element has been contacted;
determining, via the controller, when a hold-set function key included in an input unit of the mobile terminal has been selected; and
preventing the detecting step from detecting whether or not said at least one luminous element has been contacted.

28. A mobile terminal, comprising:
a display unit including a plurality of luminous elements;
a detecting unit configured to detect whether or not at least one luminous element among the plurality of luminous elements has been contacted;
a controlling unit configured to control a luminescence of said at least one luminous element when the detecting unit determines the at least one luminous element has been contacted; and
a hold-set function key configured to prevent the detecting unit from detecting whether or not said at least one luminous element has been contacted.

* * * * *